United States Patent
Nguyen et al.

(10) Patent No.: US 10,277,266 B1
(45) Date of Patent: Apr. 30, 2019

(54) MOBILE DEVICE CASE AND METHODS OF MAKING AND USING SAME

(71) Applicant: Nguyen Tech LLC, Edmond, OK (US)

(72) Inventors: Alex Nguyen, Edmond, OK (US); Jake Steelman, Edmond, OK (US); Andrew Namminga, Costa Mesa, CA (US); Long Le, Midway City, CA (US); Rian Abraham, Torrance, CA (US)

(*) Notice: Subject to any disclaimer, the term of this patent is extended or adjusted under 35 U.S.C. 154(b) by 0 days.

(21) Appl. No.: 16/110,287

(22) Filed: Aug. 23, 2018

Related U.S. Application Data (60) Provisional application No. 62/646,203, filed on Mar. 21, 2018.

(51) Int. Cl.
| | |
|---|---|
| *H04M 1/00* | (2006.01) |
| *H04B 1/3888* | (2015.01) |
| *H02J 7/00* | (2006.01) |
| *H02J 7/02* | (2016.01) |
| *H04M 1/02* | (2006.01) |

(52) U.S. Cl.
CPC .......... *H04B 1/3888* (2013.01); *H02J 7/0021* (2013.01); *H02J 7/025* (2013.01); *H04M 1/0202* (2013.01)

(58) Field of Classification Search
CPC ........ H02J 7/025; H02J 7/0044; H02J 7/0052; H02J 7/0063; H02J 7/32; H04B 1/16
See application file for complete search history.

(56) References Cited

U.S. PATENT DOCUMENTS

| | | | |
|---|---|---|---|
| 9,231,410 | B2 | 1/2016 | Wojcik et al. |
| D757,724 | S | 5/2016 | Amit et al. |
| 9,442,346 | B2 | 9/2016 | Gantz et al. |
| 9,462,093 | B2 | 10/2016 | Hegemier et al. |
| 9,584,639 | B2 | 2/2017 | Slaby et al. |
| 9,591,113 | B2 | 3/2017 | Filsner et al. |
| 9,647,474 | B2 | 5/2017 | Fathollahi et al. |
| 2010/0311475 | A1* | 12/2010 | Takatsuka ........... H04M 1/0202 455/575.1 |
| 2015/0270734 | A1 | 9/2015 | Davison et al. |
| 2016/0111692 | A1* | 4/2016 | Morita ................ H01M 2/1061 429/7 |
| 2016/0234363 | A1 | 8/2016 | Lombardi et al. |
| 2017/0090530 | A1 | 3/2017 | Filsner et al. |

* cited by examiner

*Primary Examiner* — Nhan T Le
(74) *Attorney, Agent, or Firm* — Hall Estill Law Firm

(57) ABSTRACT

A case for a mobile device includes a bumper portion and a module portion. The module portion is attached to the bumper portion. The bumper portion has a border configured to receive a mobile device. The module portion includes a base portion, a back plate and battery portion. The base portion is attached to the back plate. The battery portion is positioned between the base portion and the back plate. The battery portion includes a plurality of battery cells, a printed circuit board assembly and a plurality of electromagnetic induction coils all operably connected to one another.

18 Claims, 8 Drawing Sheets

MOBILE DEVICE CASE AND METHODS OF MAKING AND USING SAME

The present disclosure relates generally to a protective battery case for a mobile device and methods of making and using same.

Although various devices are utilized to protect mobile devices, a case and system for protecting a mobile device and providing auxiliary power and other desired features to such a device is needed and further improvements to a mobile device case and system are desirable to enhance the use of such a mobile device case and system. It is to such a mobile device case, system and methods of making and using same that the present disclosure is directed.

DETAILED DESCRIPTION

In at least certain embodiments, the present disclosure is directed to a mobile device case, system and methods used in combination with various mobile and smart devices.

The present disclosure includes a protective case for a mobile device configured to supply auxiliary electric current to a mobile device so as to increase time the mobile device can be used before recharging. The protective case includes a battery case and wireless control circuitry as disclosed herein. The embodiments disclosed herein are described in the context of a battery case for an Apple® iPhone® mobile device because the embodiments disclosed herein have particular utility in this context. However, the present disclosure provides a mobile device case, system and method that can be utilized with a variety of different portable communication devices, including but not limited to PDA's, cellular phones, smart phones, laptops, tablet computers, and other mobile devices that preferably include cellular voice and data service as well as preferably access to consumer downloadable applications. For example, the portable communication device technology platform may be Microsoft Windows Mobile, Microsoft Windows Phone 7, Palm OS, RIM Blackberry OS, Apple OS, Android OS, Symbian, Java or any other technology platform. For purposes of this disclosure, the present invention has been generally described in accordance with features and interfaces that are optimized for a smart phone utilizing a generalized platform, although one skilled in the art would understand that all such features and interfaces may also be used and adapted for any other platform and/or device.

Referring now to the drawings, and more particularly to FIGS. 1-4, shown therein, is one embodiment of a mobile device case 10 constructed in accordance with the present disclosure.

Generally, the mobile device case 10 is constructed to be utilized with a mobile device 11. Broadly, the mobile device case 10 includes a bumper portion 12 and a module portion 14, (housing).

Figure 1A:
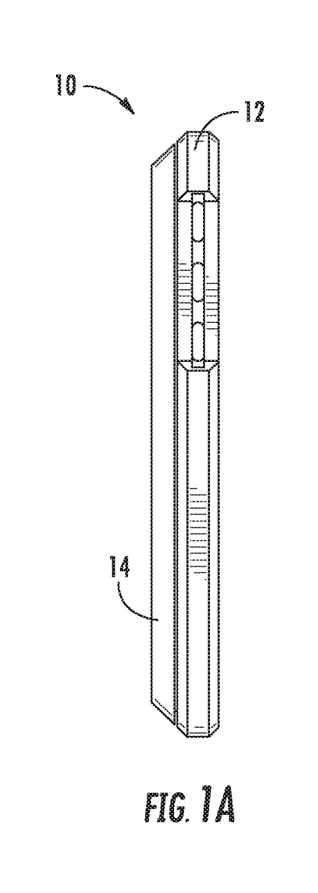
FIGS. 1(a)-1(d) are various views of a mobile device case mounted to a mobile device constructed in accordance with one embodiment of the present disclosure.
Figure 1B:
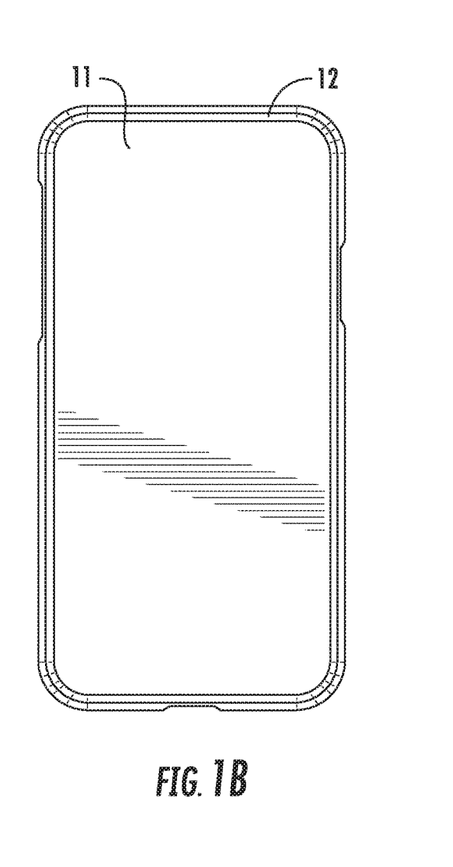
Figure 1C:
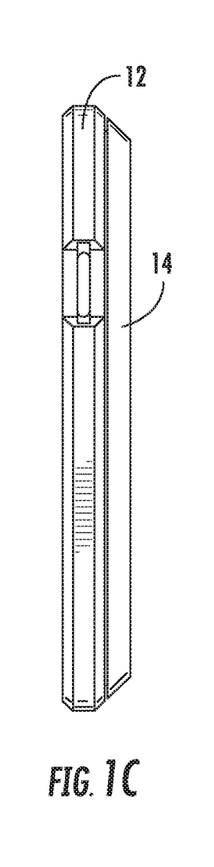
Figure 1D:
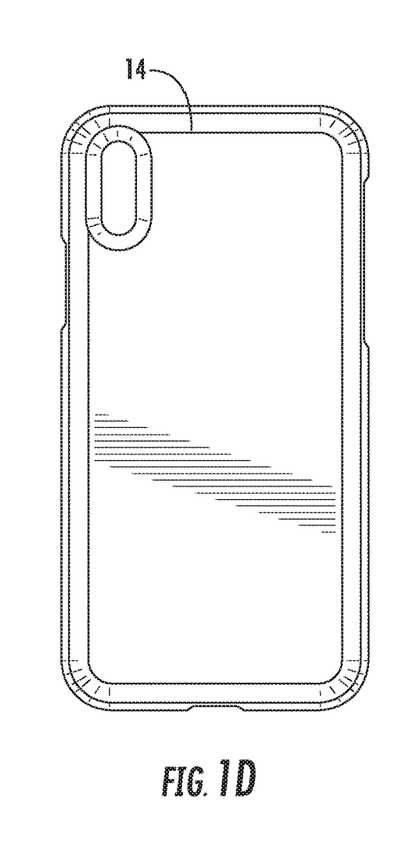
Figure 2:
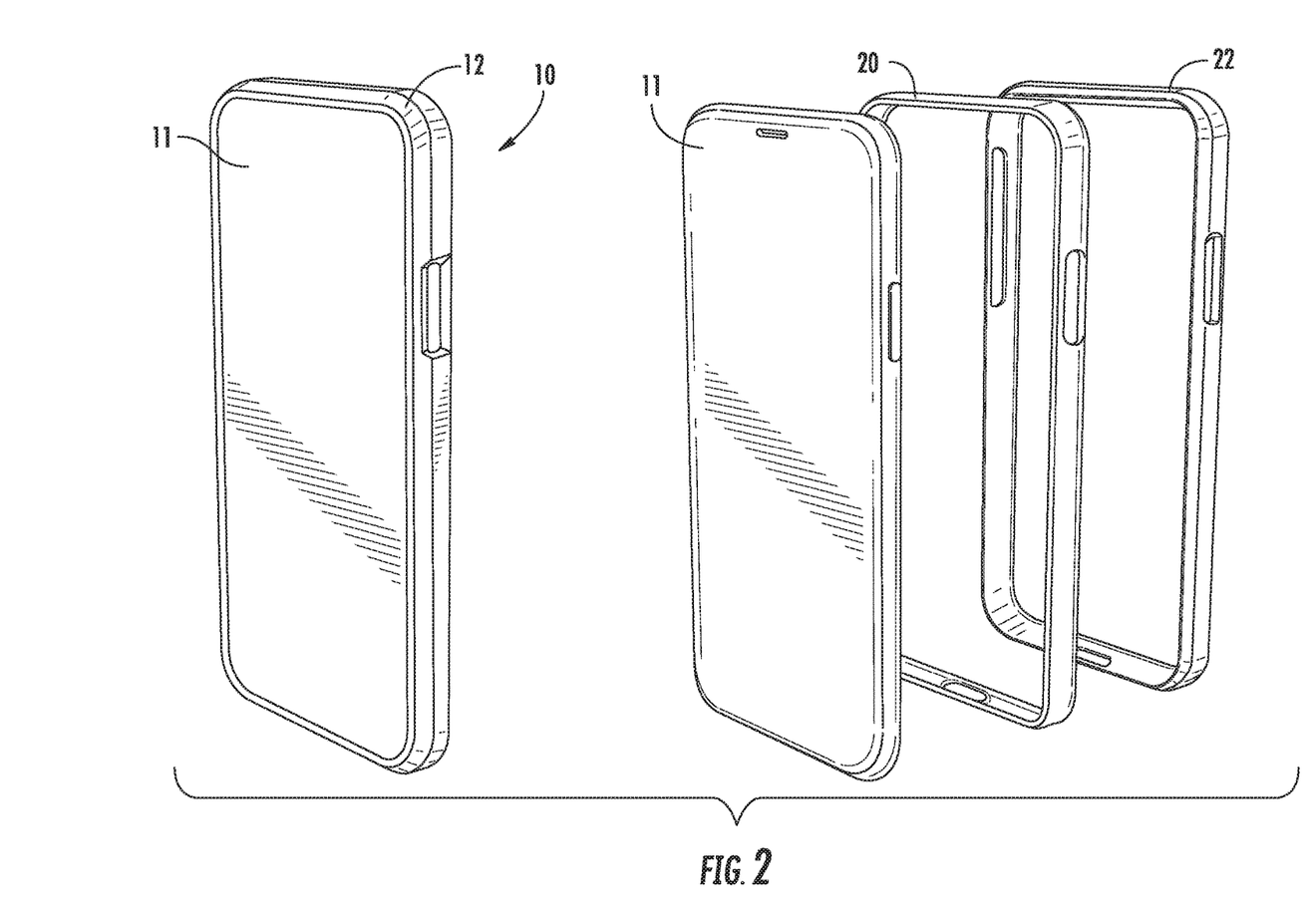
FIG. 2 is a front perspective exploded view of a bumper of the mobile device case of FIG. 1.

It is contemplated, in one embodiment, that the bumper portion 12 is constructed from multiple components 20 and 22, however, it should be understood by one of ordinary skill in the art that the bumper portion 12 may be constructed from a single piece of material. The bumper portion 12 is preferably made of plastic or polymeric material. However, the bumper portion 12 may be made from elastomeric materials, such as neoprene, rubber, latex or other such elastomeric polymer which enables the bumper potion 12 to allow the mobile device 11 to fit within the bumper portion 12. However, the materials are strong enough to allow for use of the bumper portion 12, as disclosed herein. The bumper portion 12 may be constructed from a variety of durable and resilient materials, such as for example, polymeric materials, plastics, thermoplastics, any elastomers, and composite materials which are capable of providing the desired strength and durability for the bumper potion 12. Further, it should be understood that the bumper portion 12 may be constructed from materials that may be water-resistant, impact resistant and/or waterproof.

The bumper portion 12 wraps around the mobile device 11. The inside of the bumper portion 12 is lined with a shock resistant rubberized plastic. The bumper portion 12 includes a locking portion 24 positioned along a perimeter 26 of the bumper portion 12 for receiving the module portion 14 and locking the bumper portion 12 together with the module portion 14 so as to form the mobile device case 10 as a single component.

Figure 3A:
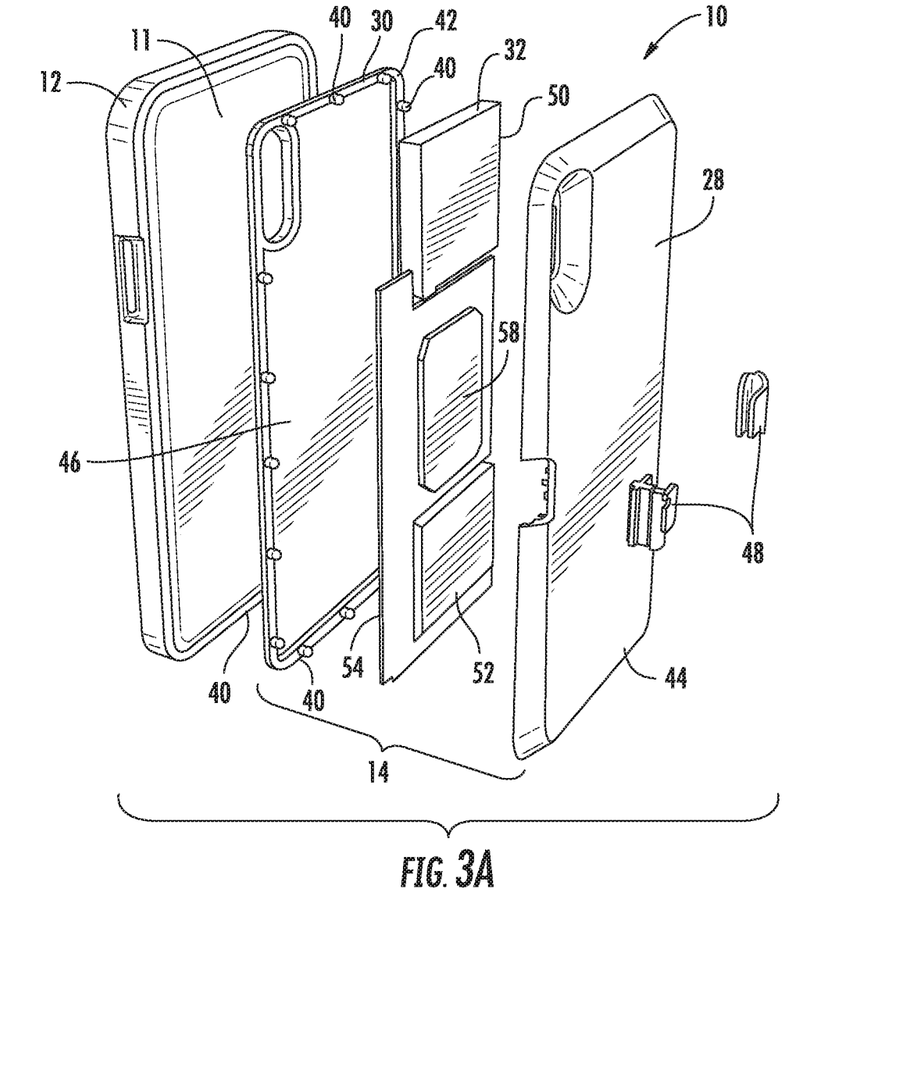
FIG. 3a is a back perspective exploded view of the mobile device case of FIG. 1.
Figure 4:
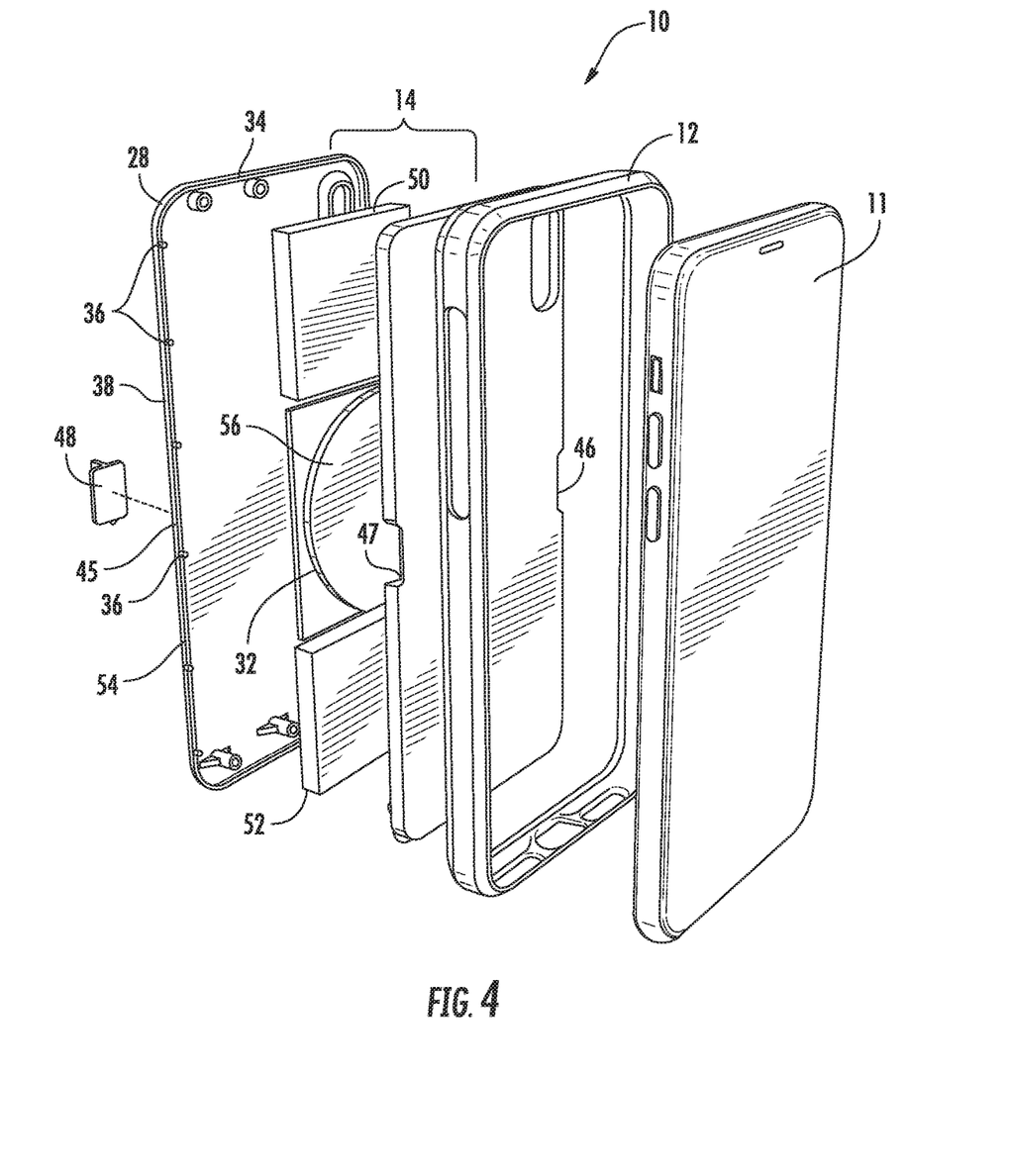
FIG. 4 is front perspective exploded view of the mobile device case of FIG. 1.

The module portion 14 includes a base portion 28, a back plate 30 and a battery portion 32 positioned between the base portion 28 and the back plate 30.

The base portion 28 is preferably made of plastic or polymeric material. However, the baser portion 28 may be made from elastomeric materials, such as neoprene, rubber, latex or other such elastomeric polymer. However, the materials are strong enough to allow for use of the base portion 28, as disclosed herein. The base portion 28 may be constructed from a variety of durable and resilient materials, such as for example, polymeric materials, plastics, thermoplastics, any elastomers, and composite materials which are capable of providing the desired strength and durability for the base potion 28. Further, it should be understood that the base portion 28 may be constructed from materials that may be water-resistant, impact resistant and/or waterproof.

The base portion 28 includes a locking portion 34 having a plurality of female portions 36 positioned along the inner perimeter 38 of the base portion 28. The backplate 30 includes a plurality of male portions 40 positioned along the inner perimeter 42 of the back plate 30. The plurality of male portions 40 correspond with the plurality of female portions 36 so as to lock the base portion 28 together with the back plate 30. Additionally, the base portion 28 includes a first recess 44 and a second recess 45. The back plate 30 includes a first recess 46 and a second recess 47 which corresponds with the first recess 44 and the second recess 45 of the base portion 28, respectively. A locking clip 48 is positioned in each of the corresponding first and second recesses to further assist in locking the base portion 28 with the back plate 30. It will be understood by one of ordinary skill in the art that any such apparatus or method for connecting two portions together may be utilized herein.

In one embodiment, the back plate 30 is a small, very thin cutout of metal, plastic, or wood that fits under the bumper portion 12 and between the mobile device 11 and bumper portion 12. In other embodiments, the back plate 30 can be positioned under the module portion 14. The back plate 30 adds a level of personalization to the mobile device case 10. Another embodiment of a backplate functions to attach a lens to the mobile device. The backplate extends over the mobile device's camera lens and includes threaded holes to screw in a lens.

Figure 3B:
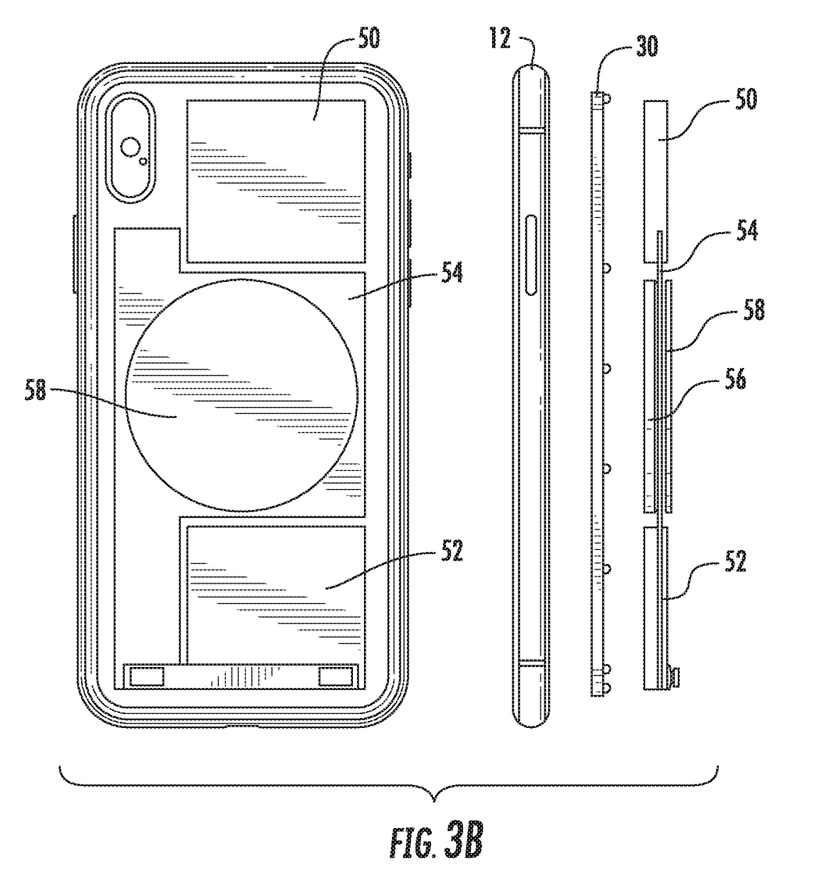
FIG. 3b is a back view of the battery portion of the mobile device of FIG. 1.

The battery portion 32 is composed of two main battery cells 50 and 52, a (printed circuit board) PCB assembly 54, and two copper wireless charging coils 56 and 58. The side of the battery module that touches the phone has a transmitting coil 56, so it can transmit power into the mobile device's receiving coil. On the backside of the battery module is a receiving coil 58, so that the wireless charging pads can charge the battery portion 32 of the module 14. Due to the layout of the wireless charging coils (not shown) users of the battery/module 14 can "stack" said modules transmitting to receiving in order to charge the module on top. For battery indication, there is a plurality of LED letters (not shown), flanked by two touch sensitive areas. A user can power the battery on using one touch sensitive area, and check the battery percentage using the other touch sensitive area. Battery percentage is shown by lighting a certain number of letters, e.g., if the case has 50% battery power, half of the letters will be lit, half will not. This module includes the locking mechanism for attaching to the bumper.

In other embodiments, the mobile device case 10 may include a wallet, lens or a plurality of desired features. The lens are extensions of the preexisting smartphone's lens; they screw into a lens backplate. Said lenses may include telephoto, macro, wide angle, fisheye, and a plurality of other types. A filter system also exists that will allow users to screw in filters between the lens itself and the lens backplate, like a polarizing filter to name one instance. In some embodiments, the shape and size of the mobile device case 10 and the size and shape of each portion of the mobile device case 10 may be designed in accordance with shape and size of the mobile electronic device and/or a desired aspect of the present disclosure.

Figure 5:
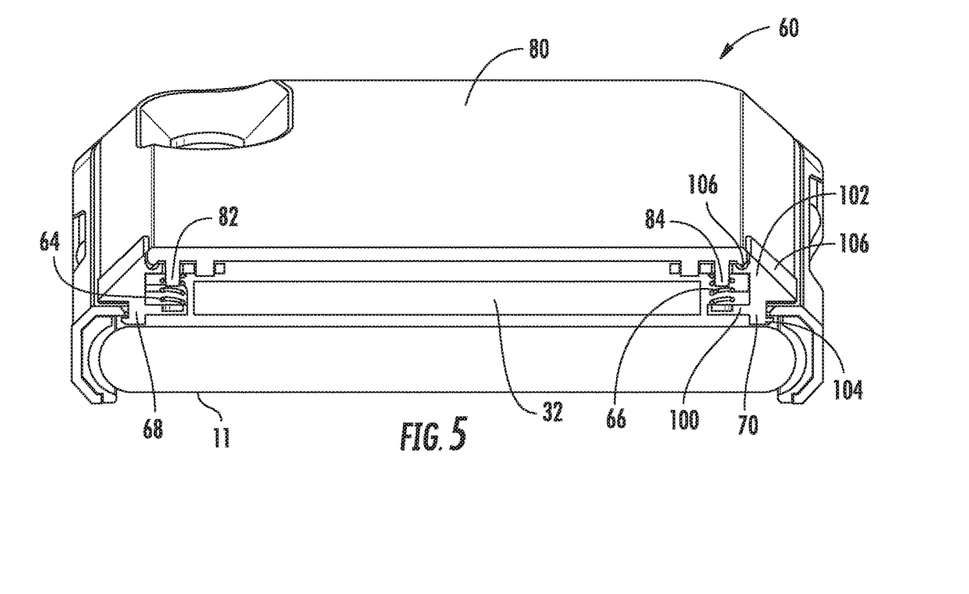
FIG. 5 is a side perspective view of a locking mechanism of another embodiment of a mobile device case constructed in accordance with another embodiment of the present disclosure.
Figure 6:
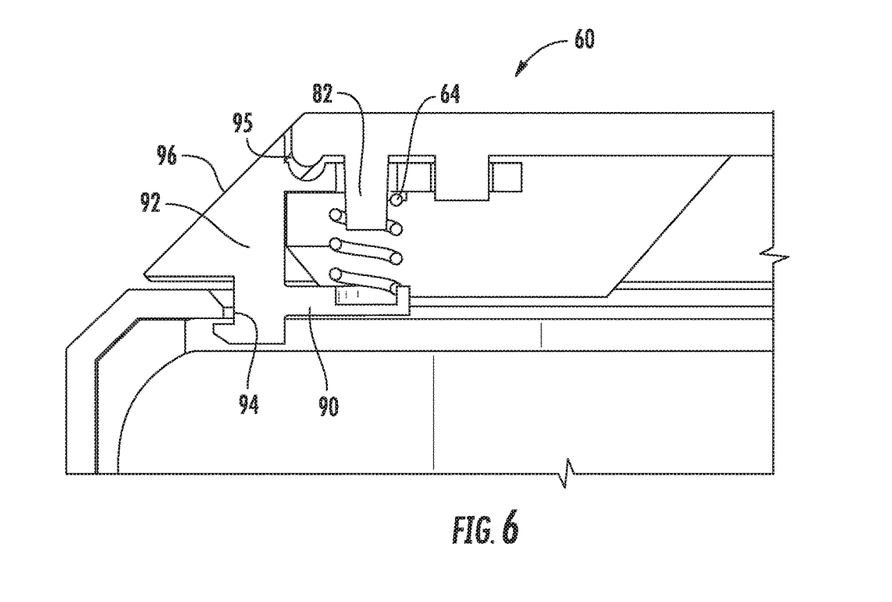
FIG. 6 is a cross-sectional view of the locking mechanism of FIG. 5.

Referring to FIGS. 5-6, shown therein is another embodiment of a locking assembly 60 of a mobile device case 61 implemented to secure the components of the mobile device case to a phone 11. The locking assembly 60 includes a pair of return springs 64 and 66 and a pair of latch assemblies 68 and 70. The return springs 64 and 66 are positioned on opposite sides 72 and 74 of an outer shell 80 which is positioned about the battery portion 32. Each spring 64 and 66 is secured to the outer shell 80 with a retainer 82 and 84, respectively. The latch assembly 68 has a first arm 90 and a second arm 92 such that the first arm 90 is substantially perpendicular to the second arm 92. The first arm 90 is operably connected to the return spring 64. The second arm 92 is configured to be releasably connected to a latch portion 94 and a hinge potion 95 of the outer shell 80. A portion of the second arm 92 forms a button 96.

The latch assembly 70 has a first arm 100 and a second arm 102 such that the first arm 100 is substantially perpendicular to the second arm 102. The first arm 100 is operably connected to the return spring 66. The second arm 102 is configured to be releasably connected to a latch portion 104 and a hinge portion 105 of the outer shell 80 and battery module components 32. A portion of the second arm 102 forms a button 106.

The locking assembly 60 moves the outer shell 80 and battery module components 32 between a latching position and an unlatching position. In the latching position, an individual presses the buttons 96 and 106 so as to bias the springs 64 and 66 to move the latch assemblies 68 and 70 in a first direction. The second arms 92 and 102 are positioned in the latch portions 94 and 104. Once positioned the individual releases pressure on the buttons 96 and 106 so that the latch assemblies 68 and 70 move in a second direction so that the outer shell 80 as well as the battery components (not depicted) are locked into the phone case 61.

In the unlatching position, the process is repeated so as to remove the outer shell 80 from the case 61.

Figure 7:
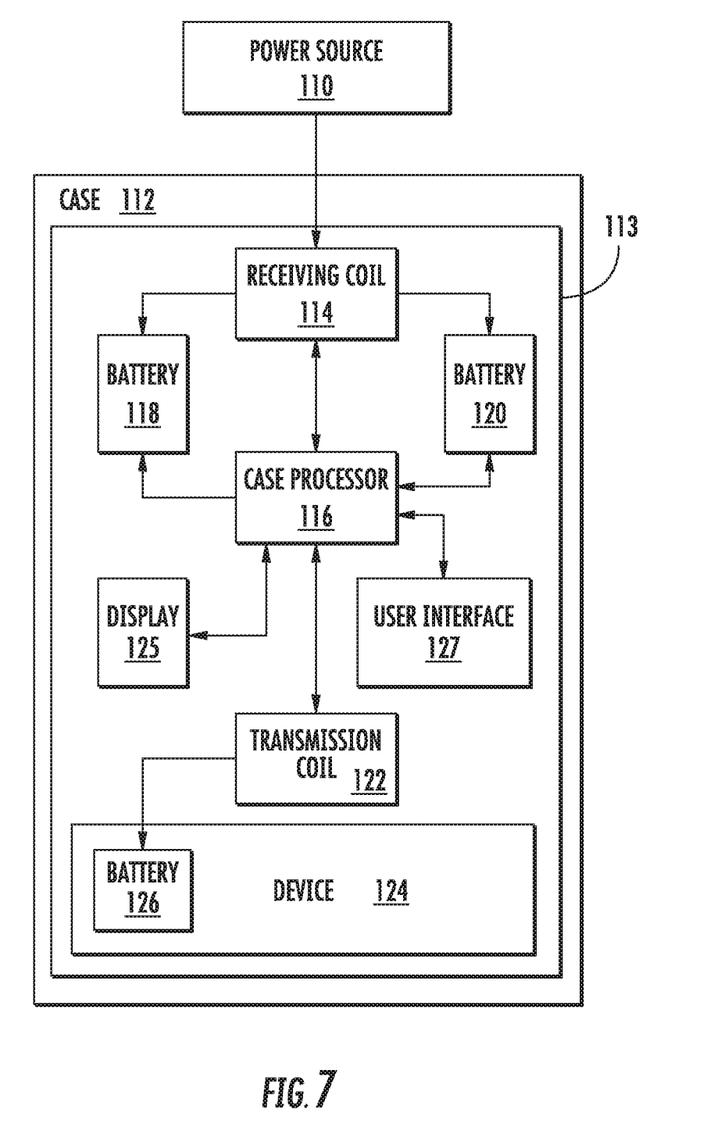
FIG. 7 illustrates one embodiment of a method of distributing current between one embodiment of a mobile device case constructed in accordance with one embodiment of the present disclosure and a mobile device.

FIG. 7 illustrates one embodiment of a mobile device case 112 interfaced to a power source 110 and a battery portion 113 of a mobile device 124. The power source 110 is a Qi charging dock which wirelessly transmits power/current to a receiving coil 114 of the battery portion 113 of the mobile device case 112. The receiving coil 114 is operably connected to a case processor 116 and batteries 118 and 120. Current from the receiving coil 114 charges the batteries 118 and 120 of the case 112. The case processor 116 operates to control different parts of the mobile device case 112. Current from a transmission coil 122 is wirelessly transmitted to a battery 126 of the mobile device 124 so as to charge the mobile device 124.

The display 125 includes any device for visually conveying information to a user of the case 112. The display 125 includes one or more of: a light emitting diode (LED), an organic light emitting diode (OLED), a liquid crystal display (LCD), electronic paper, electrophoretic ink, another type of device for visually conveying information to a user, or combinations thereof. For example, the display 125 may provide LEDs to indicate the power level of the battery or show the battery portion charging when place on a Qi charging pad. Various display configurations and methods of visually conveying information to a user are capable through communication with the case processor 116.

The user interface 127 may be a touchscreen, a switch, a button, a proximity sensor, and the like or any group or combination thereof. For example, in one embodiment, the user interface 127 is a touch area allowing a user to check for a charge on the mobile device or to act in turning the battery portion on or off in charging the mobile device. The user interface information is communicated with the case processor 116.

Figure 8:
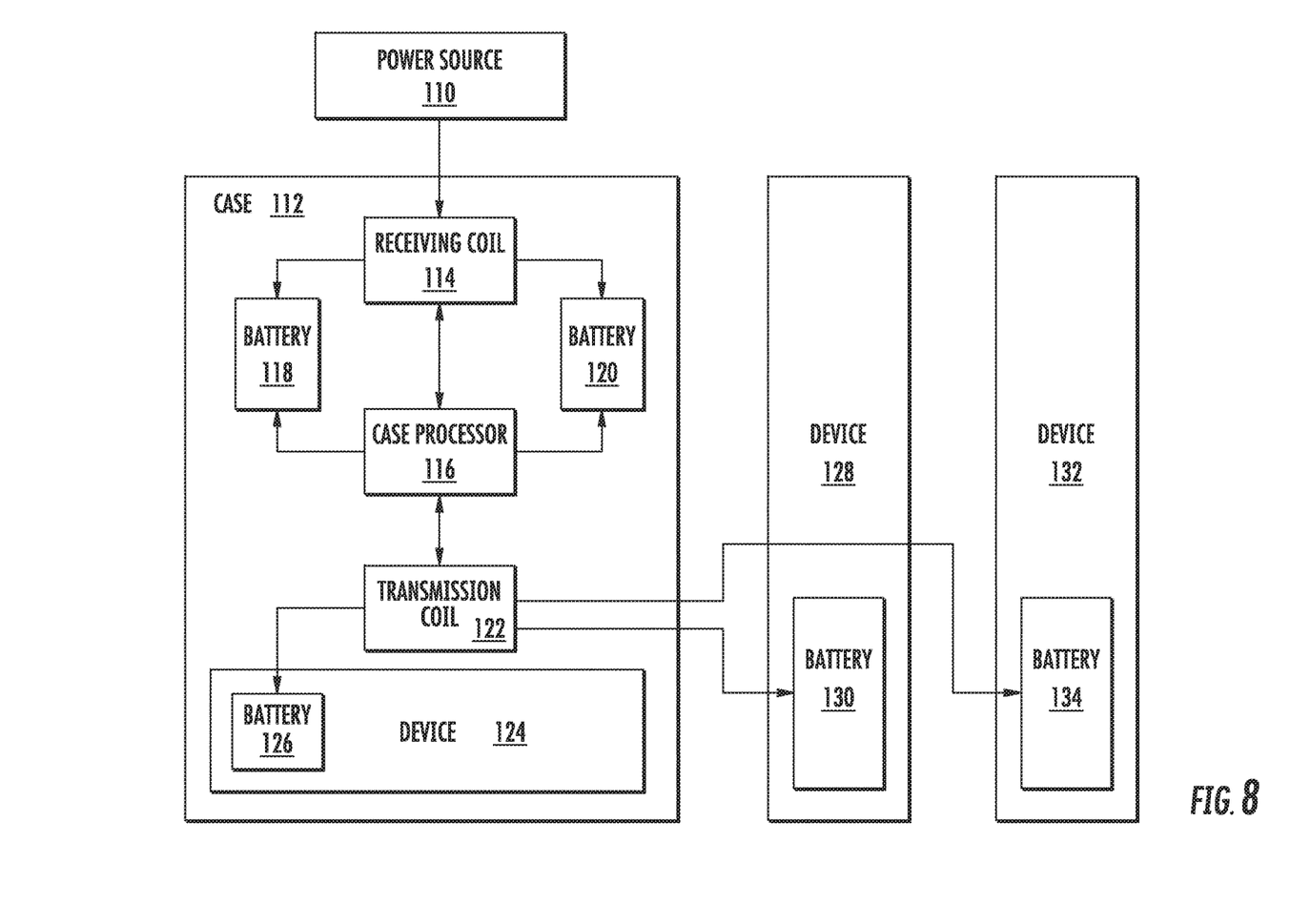
FIG. 8 illustrates the method of FIG. 7 related to a plurality of mobile devices.

FIG. 8 illustrates one embodiment of the charging method shown in FIG. 7 to charge a plurality of devices 124, 128 and 132 by stacking the plurality of devices 128 and 132 near the case 124 so as to wireless receive the current from the transmission coil 122 of the mobile device case 112.

It is important to note that the construction and arrangement of the mobile device case, system and methods as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements and elements shown as multiple parts or may be constructed to be integrally formed, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present embodiments.

From the present description, it is clear that the present invention is well-adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed.

What is claimed is:

1. A case for a mobile device, comprising:
a bumper portion having a border configured to receive a mobile device; and
a module portion comprising:
a base portion having a first side, a second side and a first cavity;
a back plate having a first side, a second side and a second cavity, wherein the first side of the base portion is attached to the first side of the back plate; and
a battery portion positioned in the first and second cavities between the base portion and the back plate, the battery portion having a plurality of battery cells, a printed circuit board assembly and a plurality of electromagnetic induction coils all operably connected to one another, wherein the module portion is connected to the bumper portion, wherein the base portion includes a locking portion having a plurality of female portions positioned along the inner perimeter of the base portion and the back plate includes a plurality of male portions positioned along the inner perimeter of the back plate such that the plurality of male portions correspond with the plurality of female portions so as to lock the base portion together with the back plate.

2. The case of claim 1 wherein the bumper portion is constructed of a plurality of components.

3. The case of claim 1 wherein a portion of the border of the bumper portion includes a shock resistant material.

4. The case of claim 1 wherein the plurality of electromagnetic induction coils of the battery portion includes at least one receiving coil positioned on one side of the battery portion for receiving a signal from a Qi wireless charger for charging the plurality of battery cells of the battery portion and at least one transmitting coil positioned on the opposite side of the battery portion for transmitting a signal to the mobile device's receiving coil for charging the mobile device's battery.

5. The case of claim 1 wherein the base portion and the back plate are provided with corresponding openings positioned over a camera lens of the mobile device.

6. The case of claim 1, wherein a portion of the case is provided with light-emitting diode letters operably connected to the plurality of battery cells so as to indicate battery life by lighting a portion of the light-emitting diode letters.

7. The case of claim 1 wherein a portion of the case is provided with touch sensitive areas which are operably connected to the printed circuit board assembly for controlling a plurality of functions of the mobile device case.

8. A case for a mobile device, comprising:
a battery portion having a plurality of battery cells, a printed circuit board assembly and a plurality of electromagnetic induction coils all operably connected to one another; and
a locking assembly releasably connected to the battery portion, the locking assembly having an outer shell and includes a pair of return springs and a pair of latch assemblies, the return springs are positioned on opposite sides of the battery portion, each latch assembly has a first arm and a second arm such that the first arm is substantially perpendicular to the second arm, the first arm is operably connected to the return spring and the second arm is configured to be releasably connected to a latch portion and a hinge potion of the outer shell such that the locking assembly is movable between a latching position and an unlatching position.

9. The case of claim 8 wherein each return spring is secured to the outer shell with a retainer.

10. The case of claim 8 wherein a portion of each second arm forms a button.

11. The case of claim 10 wherein in the latching position, an individual presses each button so as to bias the return spring and to move the latch assemblies in a first direction, the second arms are positioned in the latch portions so that once positioned the individual releases pressure on the buttons so that the latch assemblies move in a second direction so that the outer shell and the battery portion are locked into the phone case.

12. The case of claim 10 wherein in the unlatching position, an individual presses each button so as to bias the return spring and to move the latch assemblies in a first direction, the second arms are positioned in the latch portions so that once positioned the individual releases pressure on the buttons so that the latch assemblies move in a second direction so that the outer shell and the battery portion are detached from the case.

13. The case of claim 10, wherein the locking assembly is configured to connect to the mobile device.

14. A case for a mobile device, comprising:
a bumper portion having a border configured to receive a mobile device; and
a module portion comprising:
a base portion having a first side, a second side and a first cavity;
a back plate having a first side, a second side and a second cavity, wherein the first side of the base portion is attached to the first side of the back plate; and
a battery portion positioned in the first and second cavities between the base portion and the back plate, the battery portion having a plurality of battery cells, a printed circuit board assembly and a plurality of electromagnetic induction coils all operably connected to one another, wherein the module portion is connected to the bumper portion, wherein the base portion includes a first recess and a second recess such that a first locking clip is positioned in the first recess and a second locking clip is positioned in the second recess to further assist in locking the base portion with the back plate.

15. The case of claim 14 wherein the bumper portion is constructed of a plurality of components.

16. The case of claim 14 wherein a portion of the border of the bumper portion includes a shock resistant material.

17. The case of claim 14 wherein the plurality of electromagnetic induction coils of the battery portion includes at least one receiving coil positioned on one side of the battery portion for receiving a signal from a wireless charger for charging the plurality of battery cells of the battery portion and at least one transmitting coil positioned on the opposite side of the battery portion for transmitting a signal to the mobile device's receiving coil for charging the mobile device's battery.

18. The case of claim 14 wherein a portion of the case is provided with touch sensitive areas which are operably connected to the printed circuit board assembly for controlling a plurality of functions of the mobile device case.

* * * * *